(12) United States Patent
Garcia

(10) Patent No.: US 11,494,795 B1
(45) Date of Patent: Nov. 8, 2022

(54) SYSTEM FOR DYNAMIC AUTONOMOUS VEHICLE SERVICE PRICING

(71) Applicant: GM Cruise Holdings LLC, San Francisco, CA (US)

(72) Inventor: Zachary Wright Garcia, San Francisco, CA (US)

(73) Assignee: GM Cruise Holdings LLC, San Francisco, CA (US)

(*) Notice: Subject to any disclaimer, the term of this patent is extended or adjusted under 35 U.S.C. 154(b) by 325 days.

(21) Appl. No.: 16/841,268

(22) Filed: Apr. 6, 2020

(51) Int. Cl.
*G06Q 30/02* (2012.01)
*G06Q 50/30* (2012.01)
*G06Q 40/08* (2012.01)
*G06F 16/22* (2019.01)
*G06N 5/04* (2006.01)
*G01C 21/34* (2006.01)
*B60W 60/00* (2020.01)
*G06N 20/00* (2019.01)
*G05D 1/00* (2006.01)

(52) U.S. Cl.
CPC ..... *G06Q 30/0206* (2013.01); *B60W 60/0013* (2020.02); *G01C 21/3484* (2013.01); *G06F 16/2228* (2019.01); *G06N 5/04* (2013.01); *G06N 20/00* (2019.01); *G06Q 40/08* (2013.01); *G06Q 50/30* (2013.01); *G05D 1/0088* (2013.01); *G05D 2201/0213* (2013.01)

(58) Field of Classification Search
CPC .................................................. G06Q 30/0206
See application file for complete search history.

(56) References Cited

U.S. PATENT DOCUMENTS

| | | | |
|---|---|---|---|
| 11,307,042 B2 * | 4/2022 | Slusar | G01C 21/3492 |
| 2015/0187019 A1 | 7/2015 | Fernandes et al. | |
| 2020/0317216 A1 * | 10/2020 | Konrardy | B60W 30/182 |

* cited by examiner

*Primary Examiner* — Michael A Berns
(74) *Attorney, Agent, or Firm* — Akona IP PC

(57) ABSTRACT

The present disclosure provides a method comprising receiving by an autonomous vehicle ("AV") service provider a request for an AV service from a user, wherein the request identifies an origin and a destination for the AV service; identifying a plurality of possible routes between the origin and the destination; and, for each one of the plurality of possible routes assigning to the one of the possible routes at least one of a comfort score, a confidence score, and a risk an risk score based on data associated with the one of the possible routes determining a price for the one of the possible routes based on a combination of the at least one of the comfort score, the confidence score, and the risk score assigned to the one of the possible routes.

18 Claims, 6 Drawing Sheets

SYSTEM FOR DYNAMIC AUTONOMOUS VEHICLE SERVICE PRICING

TECHNICAL FIELD OF THE DISCLOSURE

The present disclosure relates generally to autonomous vehicles (AVs) and, more specifically, to a system for dynamic pricing of AV services based on multiple factors.

BACKGROUND

An autonomous vehicles (AV) is a vehicle that is capable of sensing and moving safely through its environment with little to no human input. AVs use a variety of sensors to perceive their surroundings. Autonomous delivery is an emerging technology, with delivery technology changing the way the retail supply chain functions. According to a recent study, it is likely that in the near future as many as 80% of global deliveries will be automated, as governments continue to approve and adopt regulations around autonomous vehicles and public sentiment towards such vehicles increases. AVs are also currently being tested for widespread transportation of human passengers.

One challenge faced by companies that provide AV delivery and/or transportation services is determining a price to be charged to a user for such services whether they involve transportation of a human passenger or inanimate cargo.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
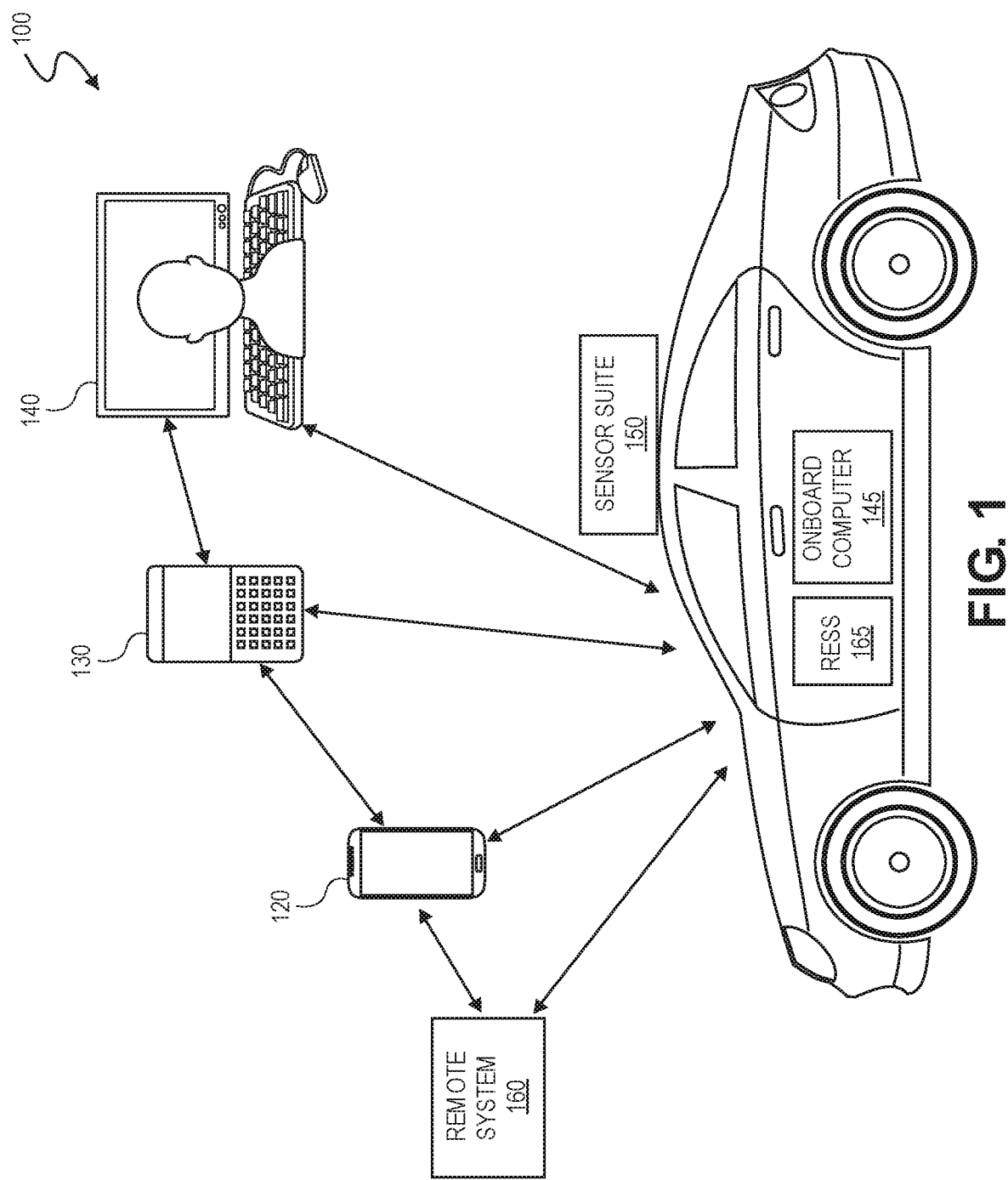
FIG. 1 is a block diagram illustrating an example autonomous vehicle in which a dynamic pricing system for AV services according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Various factors, such as time, distance, and AV availability, are commonly used in determining a price to be charged for providing AV cargo delivery services and/or AV passenger transportation services (hereinafter collectively referred to as "AV services"); however, the actual cost of an AV service to an AV service provider may be impacted by other less obvious factors as well. For example, an AV service requested by a user may require traversal of a route segment that includes numerous potholes, resulting in wear and tear on, and therefore an increase in maintenance costs associated with, the AV. Additionally and/or alternatively, an AV service requested by a user may require traversal of a route segment that includes one or more difficult driving maneuvers (such as merges and/or hair pin turns) that increase the likelihood that the AV will have to reroute, thus unexpectedly increasing the total travel time without a commensurate increase in price. As yet another example, an AV service requested by a user may require traversal of a route segment that includes a high traffic area, which may increase the likelihood that the AV will be involved in a fender bender caused by one or more distracted drivers along the high traffic route segment.

It will be noted that the aforementioned "costs" are tangible costs that may be quantifiable and/or directly attributable to a particular AV service. Other "costs" to an AV service provider that are not currently considered in pricing AV services may be less tangible/quantifiable. For example, if a requested route for a passenger transportation service includes an uncomfortable (e.g., bumpy and/or winding) route segment, it is likely that the passenger will have an unpleasant experience and may publish a negative review of the AV service provider. Additionally and/or alternatively, if a requested route for a cargo delivery service includes a route segment that tends to require frequent hard braking situations, the cargo may experience damage, thereby also potentially prompting the user to publish a negative review. The "cost" in both of these scenarios is to the service provider's reputation and while such reputational cost may be difficult to quantify, is no less real.

In accordance with features of embodiments described herein, a system for dynamic AV service pricing takes into account a variety of factors, including the tangible and reputational costs described above, in determining a price to be charged to a user for a requested AV service. In particular, the system may assign prices to each of various potential routes that may be used to provide the requested AV service to recoup certain tangible/quantifiable costs associated with providing the particular service using the route. Additionally and/or alternatively, the system may assign prices to each of various potential routes in order to influence the decision making process of the user in selecting one of the various potential routes; that is, to incentivize the user to select a route that is preferable to the AV service provider (e.g., because it is safer, more comfortable, etc.) versus a route that is less preferable to the AV service provider (e.g., because it is more dangerous, less comfortable, etc.), thus decreasing potential reputational costs associated with the AV service.

Embodiments of the present disclosure provide a method comprising receiving by an autonomous vehicle ("AV") service provider a request for an AV service from a user, wherein the request identifies an origin and a destination for the AV service; identifying a plurality of possible routes between the origin and the destination; and, for each one of the plurality of possible routes assigning to the one of the possible routes at least one of a comfort score, a confidence score, and a risk score based on data associated with the one of the possible routes determining a price for the one of the possible routes based on a combination of the at least one of the comfort score, the confidence score, and the risk score assigned to the one of the possible routes.

Embodiments of the present disclosure further provide a dynamic pricing system for providing automated vehicle ("AV") services, the system comprising a mapping information module for storing mapping information for an AV service area of an AV service provider; and a dynamic pricing module configured to receive a request for an AV service from a user, wherein the request identifies an origin and a destination for the AV service; identify a plurality of possible routes between the origin and the destination; and for each one of the plurality of possible routes. assign to the one of the possible routes at least one of a comfort score, a confidence score, and a risk score based on data associated with the one of the possible routes and determine a price for the one of the possible routes based on a combination of the at least one of the comfort score, the confidence score, and the risk score assigned to the one of the possible routes.

Embodiments of the present disclosure still further provide a vehicle comprising an onboard computer; a mapping information module for storing mapping information for an AV service area of an AV service provider; and a dynamic pricing module. The dynamic pricing module is configured to receive a request for an AV service from a user, wherein the request identifies an origin and a destination for the AV service; identify a plurality of possible routes between the origin and the destination; for each one of the plurality of possible routes assign to the one of the possible routes at least one of a comfort score, a confidence score, and a risk score based on data associated with the one of the possible routes, and determine a price for the one of the possible routes based on a combination of the at least one of the comfort score, the confidence score, and the risk score assigned to the one of the possible routes; present to the user the price determined for each of the plurality of possible routes; and store the price in the data associated with the one of the possible routes.

As will be appreciated by one skilled in the art, aspects of the present disclosure, in particular aspects of a dynamic pricing system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

One embodiment is a system for dynamic pricing of AV services using a particular route based on a variety of factors and metrics including, but not limited to, the risk of occurrence of safety critical and/or ride quality events, likelihood of occurrence of a delay event, likelihood of occurrence of reroute event, average time added by a reroute event, and/or trip comfort, to determine a price for the AV service using the route. Other pricing considerations may include one or more of the likelihood of potential cost to the AV service provider in terms of tangible costs (e.g., damage and/or wear and tear experienced by the vehicle) and/or reputational costs (e.g., a poor review due to ride discomfort, an unexpectedly long trip time and/or damage to an item being delivered). In certain embodiments, when a trip is requested, the aforementioned and/or other factors could be evaluated to produce a confidence score (indicative of relative actual, or tangible, costs associated with the route), a comfort score (indicative of a relative comfort of the AV service along the route, which may translate to reputational cost), and/or a risk score (indicative of potential damage to and/or loss of life and/or property). These scores may take into account the various costs (e.g., tangible and/or reputational) involved in providing the AV service along a particular route. For an AV service that may be provided using one of a number of different routes, pricing may be used to influence a user's route selection decision; that is, to encourage the user to select a particular one or more of the routes and/or to discourage the user from selecting a particular one or more of the routes.

As shown in FIG. 1, a dynamic AV service pricing system 100 embodying features described herein includes an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

In addition, the autonomous vehicle 110 preferably includes an onboard computer 145, a sensor suite 150 (e.g., computer vision (CV) system, Light Detection and Ranging devices (LIDAR), Radio Detection and Ranging devices (RADAR), wheel speed sensors, Global Positioning System devices (GPS), cameras, etc.), and a Rechargeable Energy Storage System (RESS) 155. The onboard computer 145 implements an autonomous driving system (ADS) for controlling the autonomous vehicle 110 and processing sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering), or a behavior of the autonomous vehicle given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic, faster routes, no highways), lighting preferences, action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles. Based upon the vehicle state and programmed instructions, the onboard computer 145 preferably modifies or controls behavior of autonomous vehicles 110. The onboard computer 145 is preferably a general-purpose computer adapted for I/O communication with vehicle control systems and sensor systems but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, Sound Navigation and Ranging devices (SONAR), LIDAR, Global Positioning System (GPS), inertial measurement units (IMUS), accelerometers, microphones, strain gauges, pressure monitors, barometers, thermometers, altimeters, etc.

A remote facility 160, which may comprise a central office or back office facility, may also be provided for providing the autonomous vehicle 110 (and particularly, onboard computer 145) with a number of different system backend functions. The remote facility 160 may include one or more switches, servers, databases, live advisors, and/or an automated voice response system ("VRS"). Remote facility 160 may include any or all of the aforementioned components, which may be coupled to one another via a wired or wireless local area network (LAN). Remote facility 160 may receive and transmit data via one or more appropriate devices and network from and to the autonomous vehicle 110, such as by wireless systems, such as 882.11x, GPRS, and the like. A database at the remote facility 160 can store account information such as subscriber authentication information, vehicle identifiers, profile records, behavioral patterns, and other pertinent subscriber information. The remote facility 160 may also include a database of roads, routes, locations, etc. permitted for use by autonomous vehicle 110. The remote facility 160 may communicate with the autonomous vehicle 110 to provide route guidance in response to a request received from the vehicle.

For example, based upon information stored in a mapping system of the remote facility 160, the remote facility may determine the conditions of various roads or portions thereof. Autonomous vehicles, such as the autonomous vehicle 110, may, in the course of determining a navigation route, receive instructions from the remote facility 160 regarding which roads or portions thereof, if any, are appropriate for use under certain circumstances, as described herein. Such instructions may be based in part on information received from the autonomous vehicle 110 or other autonomous vehicles regarding road conditions. Accordingly, remote facility 160 may receive information regarding the roads/routes generally in real-time from one or more vehicles.

The system 100 functions to enable autonomous vehicle 110 to modify and/or set a driving behavior in response to parameters set by vehicle passengers (e.g., via the passenger interface 120) and/or other interested parties (e.g., via the vehicle coordinator 130 or remote expert interface 140). In accordance with features of embodiments described herein, the system 100 further functions to enable autonomous vehicle 110 to modify and/or set a driving behavior and/or route automatically in response to delivery contents or other considerations or factors. Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc.

Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In certain embodiments, information collected by autonomous vehicles, such as autonomous vehicle 110, may be provided to the remote facility 160, which may establish a database or map of routes in a given area or region where use of an autonomous driving system may be permitted. Information may be collected from vehicles in real-time, i.e., as the vehicle(s) traverses the route(s) in question. Information may be analyzed by a central office of the remote facility 160 in real-time, or on a periodic basis. The information may be provided to vehicles collectively in the area, e.g., by way of a central database or map. For example, vehicles may pull route information from the database/map to determine appropriate route(s) for use of an autonomous driving system in any manner that is convenient. In some examples, a vehicle telematics unit may selectively communicate with the remote facility to determine whether a route may be used with an autonomous driving system. In accordance with another aspect of the invention, there is provided a system for communicating with a plurality of vehicles may include a plurality of telematics units installed into each of the vehicles. The telematics units are configured to collect route information as the vehicles are traveling along a vehicle route.

It will be recognized that maps are a key component in AV technology. In particular, the highly specialized needs of AVs require highly specialized, and high definition, maps that represent the world at a level of resolution one to two orders of magnitude greater than offered by regular web map services that are widely used for turn-by-turn navigation. Such high resolution is necessary because AVs are routinely required to execute complex maneuvers, such as safely navigating and accommodating bike lanes and pedestrian paths along roadways, for example.

An AV mapping system, or database, may include several layers, or types, of maps or mapping information. For example, the mapping database may include a standard mapping layer, a geometric mapping layer, a semantic mapping layer, a maps priors layer, and a real-time information layer. The standard mapping layer includes mapping information at a level similar/identical to that available from the aforementioned web mapping services. The geometric mapping layer includes three-dimensional (3D) mapping information for defining a drivable portion of a mapped area. The semantic mapping layer builds on the geometric mapping information by adding semantic objects, including two-dimensional (2D) and 3D traffic objects (such as parking spots, lane boundaries, intersections, crosswalks, stop signs, traffic lights) for facilitating driving safety. Semantic objects include associated metadata, such as speed limits and turn restrictions for lanes, for example.

The map priors layer includes derived information about dynamic elements as well as human driving behavior. The real-time information layer is read/write enabled and is the only portion of the mapping database designed to be updated while the AV is providing an AV service and (as its name implies) contains real-time data, such as traffic congestion, newly discovered construction zones, observed speeds, etc. The real-time information is designed to support gathering and sharing of real-time global information among a fleet of AVs.

Figure 2:
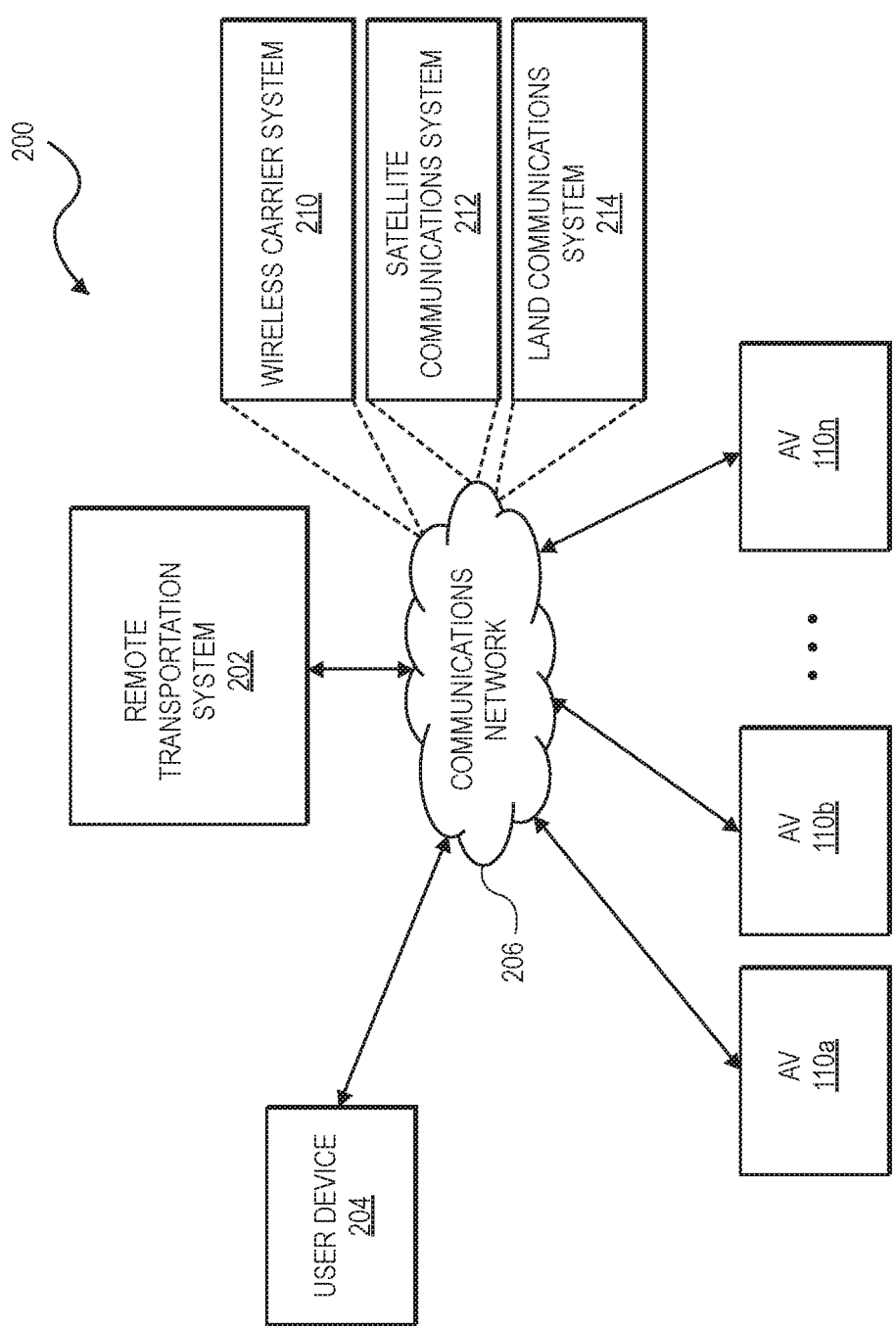
FIG. 2 is a functional block diagram illustrating a transportation system having one or more autonomous vehicles of FIG. 1 and in which a dynamic pricing system for AV services according to some embodiments of the present disclosure may be implemented.

Turning now to FIG. 2, in various embodiments, the autonomous vehicle 110 described in connection with FIG. 1 may be suitable for use in the context of a taxi, shuttle, or delivery system in a certain geographical area (e.g., a city, a school or business campus, a shopping center, an amusement park, an event center, or the like) or may simply be managed by a remote system. For example, the autonomous vehicle 110 may be associated with an autonomous vehicle based remote transportation system. FIG. 2 illustrates an exemplary embodiment of an operating environment 200 that includes an autonomous vehicle based remote transportation system 202 associated with one or more autonomous vehicles 110a-110n as described with reference to FIG. 1. In some embodiments, remote transportation system 202 may comprise some or all features of remote facility 160 (FIG. 1)

In various embodiments, the operating environment 200 further includes one or more user devices, represented in FIG. 2 by a user device 204, that communicate with the autonomous vehicle 110 and/or the remote transportation system 202 via a communication network 206. The communication network 206 supports communication as needed between devices, systems, and components supported by the operating environment 200 (e.g., via tangible communication links and/or wireless communication links). For example, the communication network 206 may include a wireless carrier system 210, such as a cellular telephone system that includes a plurality of cell towers (not shown), one or more mobile switching centers (MSCs) (not shown), as well as any other networking components required to connect the wireless carrier system 210 with a land communications system. Each cell tower includes sending and receiving antennas and a base station, with the base stations from different cell towers being connected to the MSC either directly or via intermediary equipment such as a base station controller. The wireless carrier system 210 may implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 210. For example, the base station and cell tower may be co-located at the same site or be remotely located from one another, each base station may be responsible for a single cell tower or a single base station may service various cell towers, or various base stations may be coupled to a single MSC, to name but a few of the possible arrangements.

A second wireless carrier system in the form of a satellite communication system 212 may be provided to support uni-directional or bi-directional communication with the autonomous vehicles 110a-110n. The satellite communication system may include one or more communication satellites (not shown) and an uplink transmitting station (not shown). Uni-directional communication may include, for example, satellite radio services, wherein programming content (news, music, etc.) is received by the transmitting station, packaged for upload, and then sent to the satellite, which broadcasts the programming to subscribers. Bi-directional communication may include, for example, satellite telephony services using the satellite to relay telephone communications between the vehicle 110 and the station. The satellite system 212 may be utilized either in addition to or in lieu of the wireless carrier system 210.

A land communication system 214 comprising a conventional land-based telecommunications network connected to one or more landline telephones may further be included for connecting the wireless carrier system 210 to the remote transportation system 202. For example, the land communication system 214 may include a public switched telephone network (PSTN) such as that used to provide hard-wired telephony, packet-switched data communications, and the Internet infrastructure. One or more segments of the land communication system 214 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 202 need not be connected via the land communication system 214 but may include wireless telephony equipment for communicating directly with a wireless network, such as the wireless carrier system 210.

Although only one user device 204 is shown in FIG. 2, embodiments of the operating environment 200 may support any number of user devices 204, including multiple user devices 204 owned, operated, or otherwise used by one person. Each user device 204 supported by the operating environment 200 may be implemented using any suitable hardware platform. In this regard, the user device 204 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 204 supported by the operating environment 200 is realized as a computer-implemented or computer-based device having the hardware, software, firmware, and/or processing logic needed to carry out the various techniques and methodologies described herein. For example, the user device 204 includes a microprocessor in the form of a programmable device that includes one or more instructions stored in an internal memory structure and applied to receive binary input to create binary output. In some embodiments, the user device 204 includes a GPS module capable of receiving GPS satellite signals and generating GPS coordinates based on those signals. In other embodiments, the user device 204 includes cellular communications functionality such that the device carries out voice and/or data communications over the communication network 206 using one or more cellular communications protocols, as are discussed herein. In various embodiments, the user device 204 includes a visual display, such as a touch-screen graphical display, or other display.

The remote transportation system 202 may include one or more backend server systems, which may be cloud-based, network-based, or resident at the particular campus or geographical location serviced by the remote transportation system 202. The remote transportation system 202 may be manned by a live advisor, or an autonomous advisor, or a combination of both. The remote transportation system 202 may communicate with the user devices 204 and the autonomous vehicles 110a-110n to schedule rides, dispatch autonomous vehicles 110a-110n, and the like. In various embodiments, the remote transportation system 202 may store account information, such as subscriber authentication information, vehicle identifiers, profile records, behavioral patterns, and other pertinent subscriber information. The remote transportation system 202 may further include a mapping database comprising multiple map layers such as described above.

In accordance with various embodiments, the onboard computer 145 may implement an ADS 300; that is, suitable software and/or hardware components of the onboard computer 145 are utilized to provide an autonomous driving system 300 used in conjunction with vehicle 110.

Figure 3:
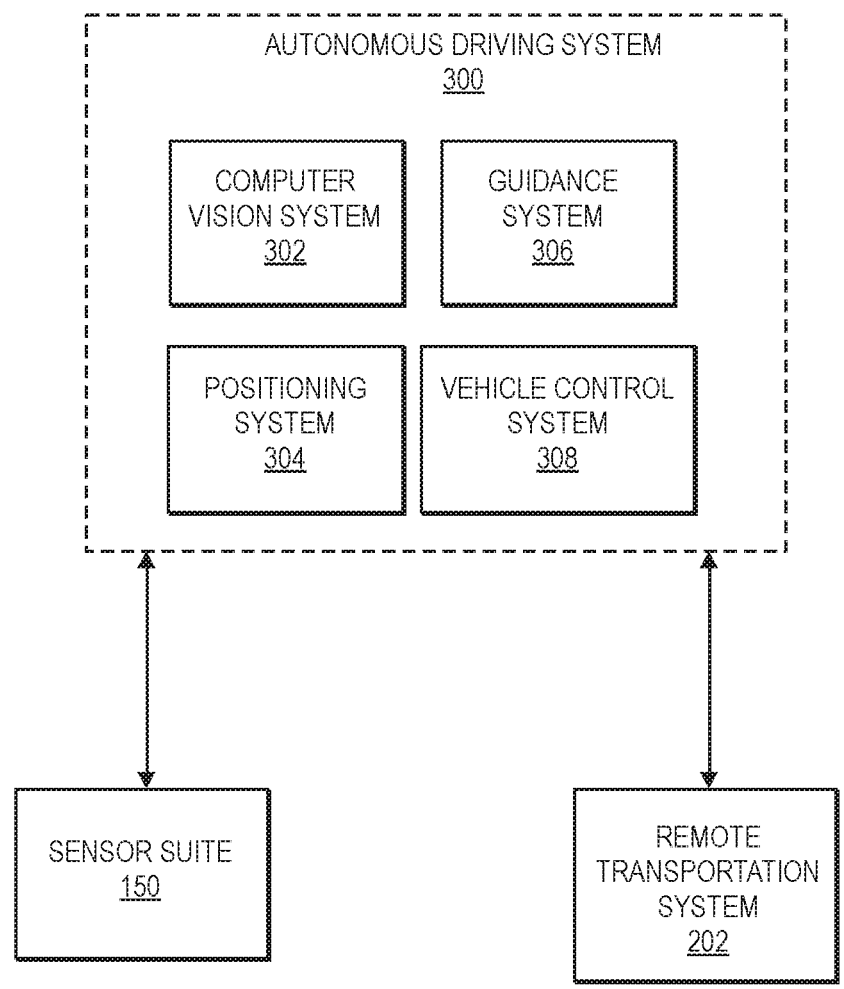
FIG. 3 is a block diagram illustrating certain aspects of a dynamic pricing system for AV services according to some embodiments of the present disclosure.

In various embodiments, the instructions of the ADS 300 may be organized by function, module, or system. For example, as shown in FIG. 3, the ADS 300 may include a CV system 302, a positioning system 304, a guidance system 306, and a vehicle control system 308. As may be appreciated, in various embodiments, the instructions may be organized into any number of systems (e.g., combined, further partitioned, etc.) and the disclosure is not limited to the cited examples.

In various embodiments, the CV system 302 may synthesize and process sensor data and predict the presence, location, classification, and/or path of objects and features of the environment of the vehicle 110. In various embodiments, the CV system 302 may incorporate information from multiple sensors, including but not limited to cameras, LIDAR, RADARS, and/or any number of other types of sensors.

The positioning system 304 may process sensor data along with other data to determine a position (e.g., a local position relative to a map, an exact position relative to lane of a road, vehicle heading, velocity, etc.) of the vehicle 110 relative to its environment. The guidance system 306 may process sensor data along with other data to determine a path for the vehicle 110 to follow. The vehicle control system 308 generates control signals for controlling the vehicle 110 according to the determined path.

In various embodiments, the onboard computer 145 may implement machine learning techniques to assist the functionality of the onboard computer, such as feature detection/classification, obstruction mitigation, route traversal, mapping, sensor integration, ground-truth determination, and the like.

Figure 4:
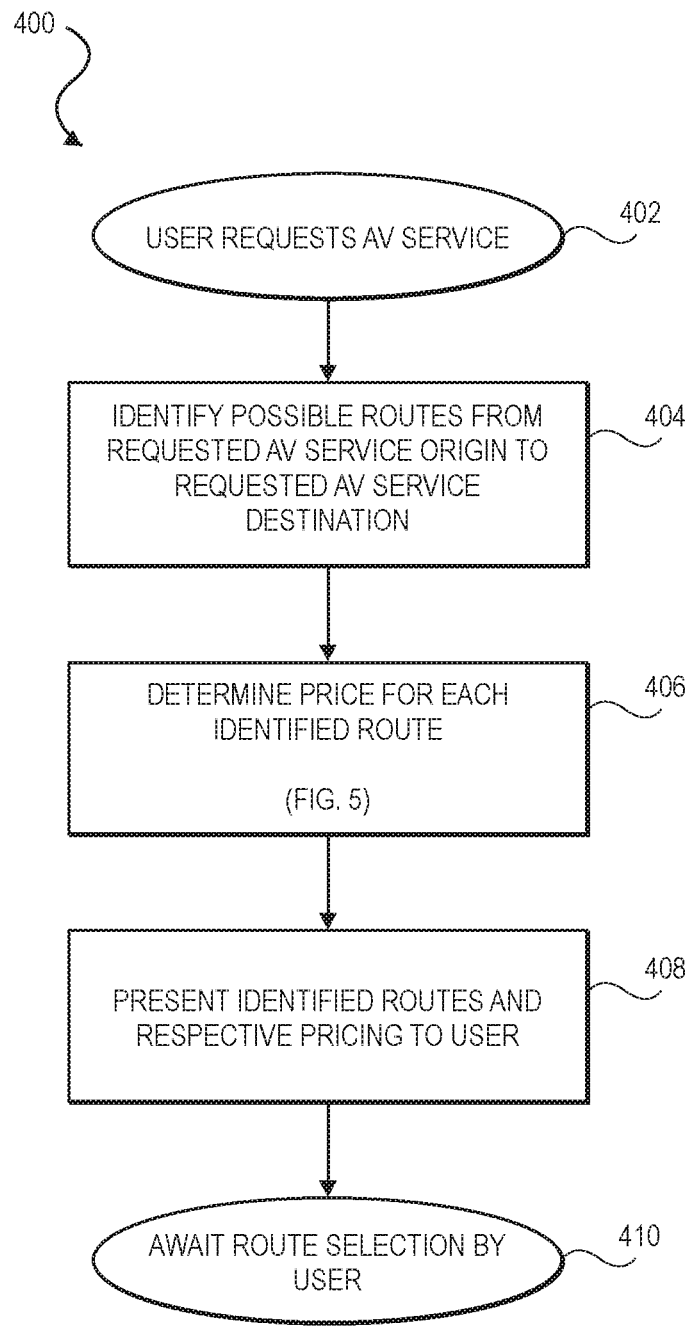
FIGS. 4 and 5 are flowcharts illustrating an example method implemented by a dynamic pricing system for AV services according to some embodiments of the present disclosure.
Figure 5:
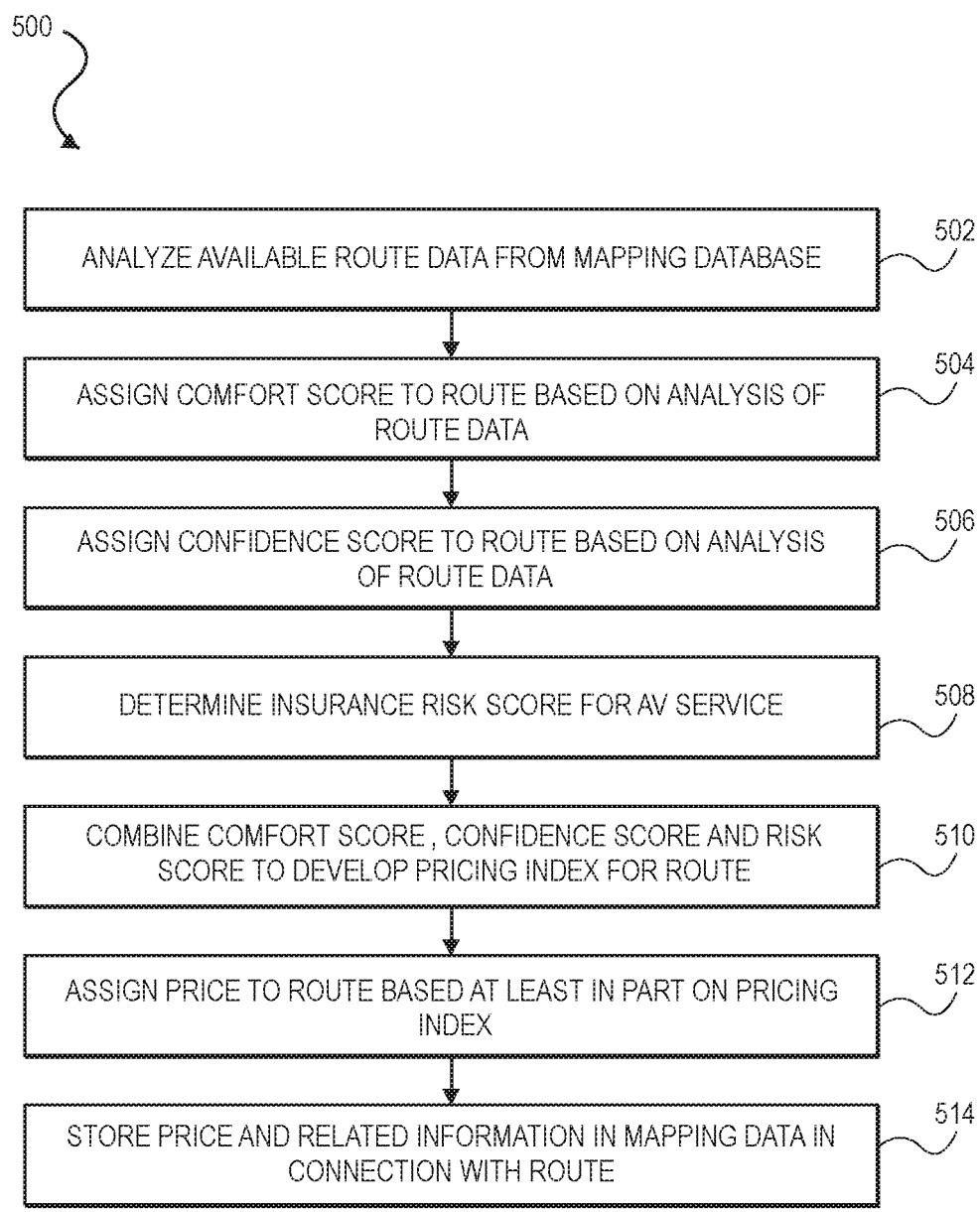

FIGS. 4 and 5 are flowcharts illustrating example processes implemented by a dynamic pricing system for AV services according to some embodiments of the present disclosure. Referring first to FIG. 4, a process 400 is initiated in response to a user requesting an AV service in step 402 via a user device (e.g., user device 204 (FIG. 2)). At a minimum, the AV service request will indicate an origin and a destination for the requested service. The AV service request may also indicate one or more of a type of service (e.g., delivery or passenger transportation), a date and time (including "as soon as possible"), and, for delivery, information regarding the item(s) to be delivered.

In step 404, a number of possible routes between the requested origin and destination are identified, using mapping data (e.g., schematic mapping information). Possible routes may include specific lanes, intersections, etc. and/or potential maneuvers required for the AV to execute the route. It will be recognized that in certain embodiments, the number of routes is a default number; alternatively, the number of routes may be configurable by a user or a system.

In step 406, a price is determined for each of the routes identified in step 404, as will be described in greater detail hereinbelow with reference to FIG. 5.

In step 408 the identified routes and associated prices are presented to the user via a user device (such as user device 204 (FIG. 2)).

In step 410, the system awaits input from the user (e.g., via user device 204 (FIG. 2) indicating one of the routes has been selected by the user.

FIG. 5 illustrates a process 500 for assigning a price to each one of a plurality of routes identified in connection with providing a requested AV service. It will be recognized that the process 500 is executed separately for each route identified in step 404 (FIG. 4).

In step 502, database data associated with the route is analyzed. For example, the route may be divided into segments with historical data for each segment being evaluated to determine for the segment one or more of a number of accidents or other safety incidents that have been experienced by AVs of the AV service provider, road quality (which may translate to passenger comfort, item safety, and AV wear and tear), speed limits, traffic patterns during the requested time period, user feedback, occurrences of reroute events, safety events, and/or ride quality events, average travel time during the requested time period, etc. The segment data may then be aggregated for the route.

Additionally and/or alternatively to per-segment route analysis, a route may be analyzed and/or characterized by the maneuvers necessary to execute that route. For example, once the route is derived, the series of maneuvers needed to execute the route (e.g., unprotected left turn followed by two lane changes followed by a right turn, etc.) may be determined. Each of these maneuvers may be further associated with additional factors (e.g., average number of hard brakes, likelihood of missing the maneuver and having to reroute, etc.) either locally or globally that should also be included in the analysis for purposes to be described in greater detail below. The maneuver data may be analyzed on a per segment basis and aggregated for the route in combination with the segment data discussed above and/or may be analyzed on a per route basis and combined with the segment data.

In step 504, a comfort score may be assigned to the route based on the analysis performed in step 502. In particular, the comfort score is indicative of overall and/or relative comfort expected to be experienced by a passenger transported by or an item delivered using the route during the selected time period based on the analyzed data. In particular, the data analyzed in step 502 on a per segment and/or per maneuver basis may be further evaluated and characterized in terms of overall effect on comfort level for the entire route on average. For example, if a route includes a relatively large number of segments that are primarily in poor condition and/or a relatively high number of complicated maneuvers are expected to be taken along the route (which may be evaluated on a per segment or per route basis), corresponding to primarily negative ride quality events, the route would be assigned a less favorable comfort score than that assigned to a route comprising roads that are well maintained and few stops (corresponding to primarily positive ride quality events). Comfort score may also consider the likelihood of delays and reroute events along the route, based on an evaluation of the analyzed data on a per segment and/or per maneuver basis, with a high likelihood of either corresponding to a less favorable comfort score. In general, a less favorable comfort score may correlate to a prediction that use of the route may result in high reputational costs to the AV service provider in the form of negative user feedback/reviews.

In step 506, a confidence score is assigned to the route based on the analysis performed in step 502. In particular, the confidence score is indicative of overall and/or relative confidence that high traffic, safety, delay, and/or reroute events will not occur along the route during the selected time period based on the analyzed data.

For example, a route that has a generally negative safety record (as evaluated on a per segment or per route basis) will be assigned a less favorable confidence score than a route that has a generally positive safety record. Additionally, a route comprising a large number of segments that have a history of and/or maneuvers that tend (either locally or globally) to result in multiple reroutes and/or high delays will be assigned a relatively less favorable confidence score, given that more time on the road will necessarily result in increased wear and tear on the AV and therefore increased maintenance costs. In general, a less favorable confidence score may correlate to a prediction that use of the route may result in high maintenance and/or repair costs (e.g., actual or tangible costs or expenses).

In step 508, a risk score for the requested AV service is determined. For example, factors that may be considered in assigning the risk score include traffic patterns along the route during the requested time period, with high traffic and/or rush hour time periods increasing the likelihood of damage to the AV and/or to the passenger and/or item being transported by the AV. Another factor that may be considered is the geographic area the route must traverse, with routes that must pass through areas having a high crime rate being assigned a less favorable risk score than a route that avoids such areas. In general, a less favorable risk score may correspond to a prediction that use of the route may result in high risk of loss of and/or damage to person or property that may ultimately increase insurance costs for the AV service provider.

As noted above, each of the comfort score, the confidence score, and the risk score may be evaluated on a per segment basis or per route basis and may include consideration of complicated maneuvers required along the segments and/or route as part of the evaluation. Such "complicated maneuvers" may be maneuvers that are known to be required in connection with a particular route/route segment (local) or that are known to be required in connection with conditions along a particular route/route segment that tend to give rise to the necessity of performing such maneuvers (global).

In step 510, the comfort score, confidence score, and risk score are combined to develop a pricing index for the route. In certain embodiments, the pricing index may be a weighted sum of the comfort score, the confidence score and/or the risk score, with the respective weights applied to each of the comfort, confidence and risk scores being static or dynamically dependent on other factors.

In step 512, a price is assigned to the route based at least in part on the pricing index. In certain embodiments, the pricing index may directly correspond to a particular price (e.g., may be used as an index into a lookup table or other database in which the index identifies a table or database entry containing the price), in which case the price corresponding to the pricing index is assigned to the route. In other embodiments, the pricing index may be applied to a base price associated with the route, e.g., as a multiplier or a weighted factor, wherein the base price may be based on such conventional pricing factors or considerations as time, distance, and AV availability.

In optional step 514, the price determined in step 512 and related information may be stored in the mapping data in connection with the route for use in updating static pricing, assessing fleet insurance costs, assessing fleet maintenance and/or repair costs, determining when individual AV maintenance and/or repairs may be necessary, etc.

Using the example methods described with reference to FIGS. 4 and 5, for an AV service that may be provided using one of a number of different routes, pricing may be used to influence a user's route selection decision; that is, to encourage the user to select a particular one or more of the routes (e.g., a route that is likely to be relatively less costly to the AV service provider) and/or to discourage the user from selecting a particular one or more of the routes (e.g., a route that is likely to be relatively more costly to the AV service provider).

Figure 6:
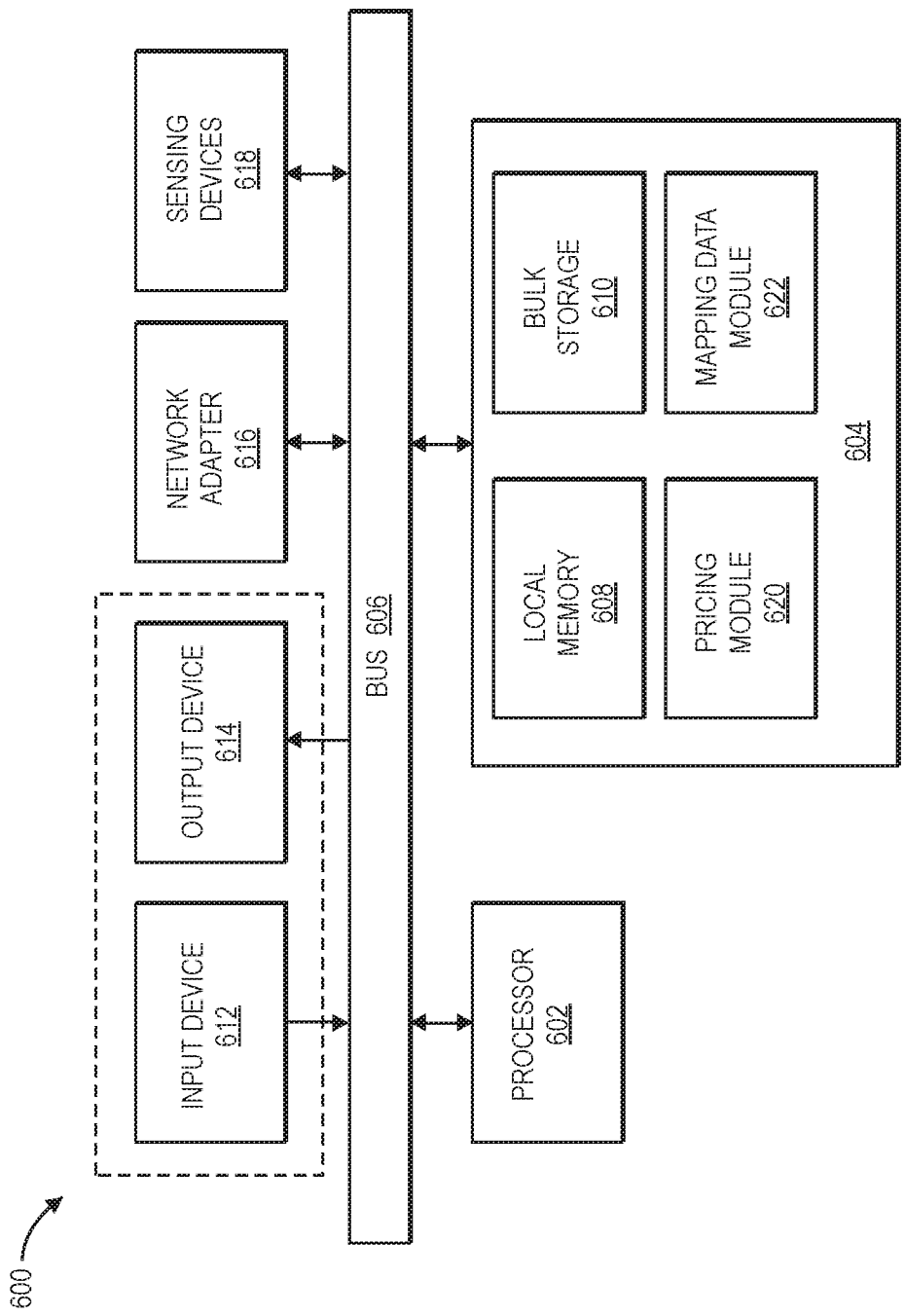
FIG. 6 is a block diagram illustrating a dynamic pricing system for AV services according to some embodiments of the present disclosure.

FIG. 6 is a block diagram illustrating an example system 600 that may be configured to implement at least portions of a dynamic AV services pricing system for an autonomous vehicle, such as the autonomous vehicle 110, in accordance with embodiments described herein, and more particularly as shown in the FIGURES described hereinabove. Part or all of the dynamic AV services pricing system 600 may be implemented as a sensor suite, such as the sensor suite 150, and/or an onboard computer, such as onboard computer 145, and/or a remote system, such as remote facility 160. As shown in FIG. 6, the dynamic AV services pricing system 600 may include at least one processor 602, e.g. a hardware processor 602, coupled to memory elements 604 through a system bus 606. As such, the system may store program code and/or data within memory elements 604. Further, the processor 602 may execute the program code accessed from the memory elements 604 via a system bus 606. In one aspect, the system may be implemented as a computer that is suitable for storing and/or executing program code (e.g., onboard computer 145). It should be appreciated, however, that the system 600 may be implemented in the form of any system including a processor and a memory that is capable of performing the functions described in this disclosure.

In some embodiments, the processor 602 can execute software or an algorithm to perform the activities as discussed in this specification; in particular, activities related to a dynamic AV services pricing system for an autonomous vehicle in accordance with embodiments described herein. The processor 602 may include any combination of hardware, software, or firmware providing programmable logic, including by way of non-limiting example a microprocessor, a Digital Signal Processor (DSP), a field-programmable gate array (FPGA), a programmable logic array (PLA), an integrated circuit (IC), an application specific IC (ASIC), or a virtual machine processor. The processor 602 may be communicatively coupled to the memory element 604, for example in a direct-memory access (DMA) configuration, so that the processor 602 may read from or write to the memory elements 604.

In general, the memory elements 604 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 600 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing a dynamic AV services pricing system for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 604 shown in FIG. 6, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 602 shown in FIG. 6, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 604 may include one or more physical memory devices such as, for example, local memory 608 and one or more bulk storage devices 610. The local memory may refer to RAM or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from the bulk storage device 610 during execution.

As shown in FIG. 6, the memory elements 604 may store a pricing module 620 and a mapping data module 622. In various embodiments, the modules 620, 622, may be stored in the local memory 608, the one or more bulk storage devices 610, or apart from the local memory and the bulk storage devices. It should be appreciated that the system 600 may further execute an operating system (not shown in FIG. 6) that can facilitate execution of the modules 620, 622. The modules 620, 622, being implemented in the form of executable program code and/or data, can be read from, written to, and/or executed by the system 600, e.g., by the processor 602. Responsive to reading from, writing to, and/or executing one of the modules 620, 622, the system 600 may be configured to perform one or more operations or method steps described herein.

Input/output (I/O) devices depicted as an input device 612 and an output device 614, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 614. Input and/or output devices 612, 614 may be coupled to the system 600 either directly or through intervening I/O controllers. Additionally, sensing devices 615, may be coupled to the system 600. Examples of sensing devices 615 may include, but are not limited to, cameras (located inside and/or outside the vehicle), LIDARs, RADARS, scales, quick response (QR) code readers, bar code readers, radio frequency (RF) sensors, and others. Sensing devices 615 may be coupled to the system 600 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 6 with a dashed line surrounding the input device 612 and the output device 614). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 616 may also, optionally, be coupled to the system 600 to enable it to become coupled to other systems, computer systems, remote network devices, and/or remote storage devices through intervening private or public networks. The network adapter may comprise a data receiver for receiving data that is transmitted by said systems, devices and/or networks to the system 600, and a data transmitter for transmitting data from the system 600 to said systems, devices and/or networks. Modems, cable modems, and Ethernet cards are examples of different types of network adapter that may be used with the system 600.

EXAMPLE 1 is a method comprising receiving by an autonomous vehicle ("AV") service provider a request for an AV service from a user, wherein the request identifies an origin and a destination for the AV service; identifying a plurality of possible routes between the origin and the destination; and for each one of the plurality of possible routes assigning to the one of the possible routes at least one of a comfort score, a confidence score, and a risk score based on mapping data associated with the one of the possible routes and determining a price for the one of the possible routes based on a combination of the at least one of the comfort score, the confidence score, and the risk score assigned to the one of the possible routes.

In EXAMPLE 2, the method of EXAMPLE 1 may further include presenting to the user the price determined for each of the plurality of possible routes.

In EXAMPLE 3, the method of any of EXAMPLES 1-2 may further include storing the price in the data associated with the one of the possible routes.

In EXAMPLE 4, the method of any of EXAMPLES 1-3 may further include the determining a price for the one of the possible routes further comprising combining at least two of the comfort score, the confidence score, and the risk score to develop a pricing index for the one of the possible routes, wherein the pricing index identifies an entry in a lookup table that contains the price for the one of the possible routes.

In EXAMPLE 5, the method of any of EXAMPLES 1-4 may further include the determining a price for the one of the possible routes further comprising combining at least two of the comfort score, the confidence score, and the risk score to develop a pricing index for the one of the possible routes; and multiplying a base price for the one of the possible routes by the pricing index.

In EXAMPLE 6, the method of any of EXAMPLES 1-5 may further include the combining further comprising, for each of the at least two of the comfort score, the confidence score, and the risk score, weighting the score, wherein the pricing index comprises a sum of the weighted scores.

In EXAMPLE 7, the method of any of EXAMPLES 1-6 may further include the assigning to the one of the possible routes at least one of a comfort score, a confidence score, and a risk score further comprising analyzing the mapping data associated with at least a portion of the one of the possible routes to determine at least one physical property of the at least a portion of the one of the possible routes and a number of complex maneuvers that are required to be performed along the at least a portion of the one of the possible routes.

In EXAMPLE 8, the method of any of EXAMPLES 1-7 may further include the analyzing the mapping data associated with at least a portion of the one of the possible routes further comprising analyzing the at least one physical property to determine the number of complex maneuvers.

In EXAMPLE 9, the method of any of EXAMPLES 1-8 may further include the comfort score being indicative of a relative reputational cost to the AV service provider in connection providing the requested AV service using the one of the possible routes.

In EXAMPLE 10, the method of any of EXAMPLES 1-9 may further include the confidence score being indicative of a relative tangible cost to the AV service provider in connection providing the requested AV service using the one of the possible routes.

In EXAMPLE 11, the method of any of EXAMPLES 1-10 may further include the risk score being indicative of a relative risk of cost resulting from at least one of damage to and loss of at least one of life and property to the AV service provider in connection providing the requested AV service using the one of the possible routes.

EXAMPLE 12 is a dynamic pricing system for providing automated vehicle ("AV") services including a mapping information module for storing mapping information for an AV service area of an AV service provider; and a dynamic pricing module configured to receive a request for an AV service from a user, wherein the request identifies an origin and a destination for the AV service; identify a plurality of possible routes between the origin and the destination; and, for each one of the plurality of possible routes, assign to the one of the possible routes at least one of a comfort score, a confidence score, and a risk score based on data associated with the one of the possible routes; and determine a price for the one of the possible routes based on a combination of the at least one of the comfort score, the confidence score, and the risk score assigned to the one of the possible routes.

In EXAMPLE 13, the system of EXAMPLE 12 may further include the dynamic pricing module being further configured to present to the user the price determined for each of the plurality of possible routes.

In EXAMPLE 14, the system of any of EXAMPLES 12-13 may further include the dynamic pricing module being further configured to store the price in the data associated with the one of the possible routes.

In EXAMPLE 15, the system of any of EXAMPLES 12-14 may further include the dynamic pricing module being configured to determine a price for the one of the possible routes by combining at least two of the comfort score, the confidence score, and the risk score to develop a pricing index for the one of the possible routes, wherein the pricing index identifies an entry in a lookup table that contains the price for the one of the possible routes.

In EXAMPLE 16, the system of any of EXAMPLES 12-15 may further include the dynamic pricing module being configured to determine a price for the one of the possible routes by combining at least two of the comfort score, the confidence score, and the risk score to develop a pricing index for the one of the possible routes; and multiplying a base price for the one of the possible routes by the pricing index.

In EXAMPLE 17, the system of any of EXAMPLES 12-16 may further include the combining further comprising, for each of the at least two of the comfort score, the confidence score, and the risk score, weighting the score, wherein the pricing index comprises a sum of the weighted scores.

In EXAMPLE 18, the system of any of EXAMPLES 12-17 may further include the assigning to the one of the possible routes at least one of a comfort score, a confidence score, and a risk score further comprising analyzing the mapping data associated with at least a portion of the one of the possible routes to determine at least one physical property of the at least a portion of the one of the possible routes and a number of complex maneuvers that are required to be performed along the at least a portion of the one of the possible routes.

In EXAMPLE 19, the system of any of EXAMPLES 12-18 may further include the analyzing the mapping data associated with at least a portion of the one of the possible routes further comprising analyzing the at least one physical property to determine the number of complex maneuvers.

EXAMPLE 20 is a vehicle including an onboard computer; a mapping information module for storing mapping information for an AV service area of an AV service provider; and a dynamic pricing module. The dynamic pricing module is configured to receive a request for an AV service from a user, wherein the request identifies an origin and a destination for the AV service; identify a plurality of possible routes between the origin and the destination; and, for each one of the plurality of possible routes assign to the one of the possible routes at least one of a comfort score, a confidence score, and a risk score based on data associated with the one of the possible routes; and determine a price for the one of the possible routes based on a combination of the at least one of the comfort score, the confidence score, and the risk score assigned to the one of the possible routes. The dynamic pricing module is further configured to present to the user the price determined for each of the plurality of possible routes; and store the price in the data associated with the one of the possible routes. The dynamic pricing module is configured to determine a price for the one of the possible routes by combining at least two of the comfort score, the confidence score, and the risk score to develop a pricing index for the one of the possible routes by, for each of the at least two of the comfort score, the confidence score, and the risk score, weighting the score, wherein the pricing index comprises a sum of the weighted scores; and multiplying the pricing index by a base price for the one of the possible routes.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field-Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
   receiving by an autonomous vehicle ("AV") service provider a request for an AV service from a user, wherein the request identifies an origin and a destination for the AV service;
   identifying a plurality of possible routes between the origin and the destination; and
   for each of the plurality of possible routes:
      assigning to the one of the possible routes at least one of a comfort score, a confidence score, and a risk score based on mapping data associated with the one of the possible routes; and
      determining a price for the one of the possible routes based on a combination of the at least one of the comfort score, the confidence score, and the risk score assigned to the one of the possible routes;
   wherein the determining a price for the one of the possible routes further comprises:
      combining at least two of the comfort score, the confidence score, and the risk score to develop a pricing index for the one of the possible routes; and
      multiplying a base price for the one of the possible routes by the pricing index;
   wherein at least one of the assigning and determining is implemented using machine learning techniques.

2. The method of claim 1 further comprising presenting to the user the price determined for each of the plurality of possible routes.

3. The method of claim 1 further comprises storing the price in the data associated with the one of the possible routes.

4. The method of claim 1, wherein the determining a price for the one of the possible routes further comprises:
   combining at least two of the comfort score, the confidence score, and the risk score to develop a pricing index for the one of the possible routes;
   wherein the pricing index identifies an entry in a lookup table that contains the price for the one of the possible routes.

5. The method of claim 1, wherein the combining further comprises:
   weighting each of the at least two of the comfort score, the confidence score, and the risk score to generate weighted scores,
   wherein the pricing index comprises a sum of the weighted scores.

6. The method of claim 1, wherein the assigning to the one of the possible routes at least one of a comfort score, a confidence score, and a risk score further comprises analyzing the mapping data associated with at least a portion of the one of the possible routes to determine at least one physical property of the at least a portion of the one of the possible routes and a number of complex maneuvers that are required to be performed along the at least a portion of the one of the possible routes.

7. The method of claim 6, wherein the analyzing the mapping data associated with at least a portion of the one of the possible routes further comprises analyzing the at least one physical property to determine the number of complex maneuvers.

8. The method of claim 1, wherein the comfort score is indicative of a relative reputational cost to the AV service provider in connection providing the requested AV service using the one of the possible routes.

9. The method of claim 1, wherein the confidence score is indicative of a relative tangible cost to the AV service provider in connection providing the requested AV service using the one of the possible routes.

10. The method of claim 1, wherein the risk score is indicative of a relative risk of cost resulting from at least one of damage to and loss of at least one of life and property to the AV service provider in connection providing the requested AV service using the one of the possible routes.

11. A dynamic pricing system for providing automated vehicle ("AV") services, the system comprising:
  a processor;
  a computer storage medium comprising a mapping information module for storing mapping information for an AV service area of an AV service provider; and
  a dynamic pricing module comprising at least one non-transitory computer-readable media storing instructions executable to perform operations comprising:
    receiving a request for an AV service from a user, wherein the request identifies an origin and a destination for the AV service;
    identifying a plurality of possible routes between the origin and the destination; and
    for each one of the plurality of possible routes:
      assigning to the one of the possible routes at least one of a comfort score, a confidence score, and a risk score based on data associated with the one of the possible routes; and
      determining a price for the one of the possible routes based on a combination of the at least one of the comfort score, the confidence score, and the risk score assigned to the one of the possible routes;
    wherein the dynamic pricing module is configured to determine a price for the one of the possible routes by:
      combining at least two of the comfort score, the confidence score, and the risk score to develop a pricing index for the one of the possible routes; and
      multiplying a base price for the one of the possible routes by the pricing index;
    wherein at least one of the assigning and determining is implemented using machine learning techniques.

12. The system of claim 11, wherein the dynamic pricing module is further configured to present to the user the price determined for each of the plurality of possible routes.

13. The system of claim 11, wherein the dynamic pricing module is further configured to store the price in the data associated with the one of the possible routes.

14. The system of claim 11, wherein the dynamic pricing module is configured to determine a price for the one of the possible routes by:

combining at least two of the comfort score, the confidence score, and the risk score to develop a pricing index for the one of the possible routes;
wherein the pricing index identifies an entry in a lookup table that contains the price for the one of the possible routes.

15. The system of claim 11, wherein the combining further comprises:
  weighting each of the at least two of the comfort score, the confidence score, and the risk score to generate weighted scores; and
  wherein the pricing index comprises a sum of the weighted scores.

16. The system of claim 11, wherein the assigning to the one of the possible routes at least one of a comfort score, a confidence score, and a risk score further comprises analyzing the mapping data associated with at least a portion of the one of the possible routes to determine at least one physical property of the at least a portion of the one of the possible routes and a number of complex maneuvers that are required to be performed along the at least a portion of the one of the possible routes.

17. The system of claim 16, wherein the analyzing the mapping data associated with at least a portion of the one of the possible routes further comprises analyzing the at least one physical property to determine the number of complex maneuvers.

18. A vehicle comprising:
  an onboard computer;
  a computer storage medium comprising a mapping information module accessible by the onboard computer for storing mapping information for an AV service area of an AV service provider; and
  a dynamic pricing module comprising at least one non-transitory computer-readable media storing instructions executable to perform operations comprising:
    receiving a request for an AV service from a user, wherein the request identifies an origin and a destination for the AV service;
  identifying a plurality of possible routes between the origin and the destination; for each one of the plurality of possible routes:
  assigning to the one of the possible routes at least one of a comfort score, a confidence score, and a risk score based on data associated with the one of the possible routes; and
  determining a price for the one of the possible routes based on a combination of the at least one of the comfort score, the confidence score, and the risk score assigned to the one of the possible routes;
  presenting to the user the price determined for each of the plurality of possible routes; and
  storing the price in the data associated with the one of the possible routes; wherein the dynamic pricing module is configured to determine a price for the one of the possible routes by:
    combining at least two of the comfort score, the confidence score, and the risk score to develop a pricing index for the one of the possible routes by, weighting each of the at least two of the comfort score, the confidence score, and the risk score to generate weighted scores; and, wherein the pricing index comprises a sum of the weighted scores; and
    multiplying the pricing index by a base price for the one of the possible routes wherein at least one of the assigning and determining is implemented using machine learning techniques.

* * * * *